(12) United States Patent
Chase

(10) Patent No.: US 10,119,701 B2
(45) Date of Patent: Nov. 6, 2018

(54) FURNACE COMBUSTION SYSTEM AND METHOD

(71) Applicant: Johnson Controls Technology Company, Holland, MI (US)

(72) Inventor: Thomas D. Chase, Rose Hill, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 597 days.

(21) Appl. No.: 14/704,751

(22) Filed: May 5, 2015

(65) Prior Publication Data

US 2015/0338088 A1 Nov. 26, 2015

Related U.S. Application Data

(60) Provisional application No. 62/001,464, filed on May 21, 2014.

(51) Int. Cl.
| | |
|---|---|
| *F23B 10/00* | (2011.01) |
| *F23B 10/02* | (2011.01) |
| *F23L 9/04* | (2006.01) |
| *B23P 19/04* | (2006.01) |
| *F24H 3/08* | (2006.01) |
| *F24H 9/20* | (2006.01) |
| *F23L 9/06* | (2006.01) |
| *F23D 14/04* | (2006.01) |
| *F23D 14/46* | (2006.01) |

(52) U.S. Cl.
CPC .............. *F23B 10/02* (2013.01); *B23P 19/04* (2013.01); *F23D 14/045* (2013.01); *F23D 14/46* (2013.01); *F23L 9/04* (2013.01); *F23L 9/06* (2013.01); *F24H 3/08* (2013.01); *F24H 3/087* (2013.01); *F24H 9/2085* (2013.01); *Y10T 29/4935* (2015.01)

(58) Field of Classification Search
USPC ....... 126/116 R, 110 R, 104 A, 111; 110/214
See application file for complete search history.

(56) References Cited

U.S. PATENT DOCUMENTS

| | | | | |
|---|---|---|---|---|
| 2,808,047 | A * | 10/1957 | Jaye ........................ | F24H 3/105 126/110 R |
| 2007/0272228 | A1* | 11/2007 | Slaby .................... | F23D 14/045 126/104 A |
| 2012/0240917 | A1* | 9/2012 | Tolleneer ................ | F24H 3/087 126/116 R |
| 2012/0247444 | A1* | 10/2012 | Sherrow .................. | F24H 9/14 126/116 R |

* cited by examiner

*Primary Examiner* — Avinash Savani
(74) *Attorney, Agent, or Firm* — Fletcher Yoder, P.C.

(57) ABSTRACT

A furnace system includes a burner assembly configured to generate combustion products within a primary combustion zone comprising one or more burners. The furnace system includes a panel disposed downstream of the burner assembly along a flow path for the combustion products, where the panel includes at least one panel opening. The furnace system also includes a secondary combustion air gap defined by one or more spacers disposed between the burner assembly and the panel, such that a secondary combustion zone is established between the burner assembly and the panel and/or downstream of the panel. The secondary combustion air gap is downstream from and external the burner assembly.

17 Claims, 6 Drawing Sheets

FURNACE COMBUSTION SYSTEM AND METHOD

CROSS-REFERENCE TO RELATED APPLICATION

This application claims priority from and the benefit of U.S. Provisional Application Ser. No. 62/001,464, filed May 21, 2014, entitled "FURNACE COMBUSTION SYSTEM AND METHOD," which is hereby incorporated by reference in its entirety for all purposes.

BACKGROUND

The present disclosure relates generally to furnace systems, and more specifically, to burner assemblies and components related to combustion included in furnace systems. A wide range of applications exists for furnace systems, including residential, commercial, and industrial applications. For example, a residential furnace system may include a burner assembly (e.g., having one or more burners) and a heat exchanger to produce hot air to heat an enclosed space such as a living room, a bedroom, a bathroom, or some other residential room. Generally, furnace systems operate by burning or combusting a mixture of air and fuel in the burner assembly to produce combustion products. The combustion products may pass through tubes or piping in the heat exchanger, where air passing over the tubes or pipes extracts heat from the combustion products, such that the heated air may be exported from the furnace system for heating a load (e.g., a room).

Because the combustion products are generated via combustion in the burner assembly and heat exchanger, efficiency of the burner assembly directly affects the efficacy of the furnace system. Accordingly, it is now recognized that there is a need for improving efficiency of combustion in furnace systems.

DRAWINGS

DETAILED DESCRIPTION

The present disclosure is directed to furnace systems and burner assemblies included in furnace systems. A burner assembly may be included in a furnace system to burn a mixture of fuel and air to generate combustion products (e.g., via ignition by an igniter). The combustion products generated in the burner assembly and heat exchanger (e.g., due to burning/combusting extending from the burner assembly to a portion of the heat exchanger) may be routed through one or more passages (e.g., tubes or piping) in a heat exchanger to facilitate heat exchange with a medium (e.g., air) that will be utilized to warm a particular area (e.g., a room). Specifically, for example, the combustion products may be routed through tubes of a heat exchanger and a fan may blow air over the tubes of the heat exchanger. Thus, the air blown over the tubes may extract heat from the combustion products passing through the tubes, and the heated air may be exported to a load (e.g., an enclosed room) for warming the load. Combustion products may be exported from the furnace system via any of various removal systems. For example, a combustion air blower may suck the combustion products through the tubes of the heat exchanger and blow the combustion products into an area away from the furnace system or a chimney may guide the combustion products to an external environment.

Many factors associated with the burner assembly affect thermodynamic properties of the combustion products. For example, a certain ratio of fuel and air in the mixture may affect a temperature of the combustion products. Further, many factors associated with furnace systems affect noise of combustion occurring in the furnace system. In accordance with embodiments of the present disclosure, a secondary combustion air gap, depending on a location and configuration of the secondary combustion air gap, may enable improved combustion/burning in and proximate the burner assembly, such that combustion is enhanced, thermodynamic properties of the combustion products are enhanced for heat exchange in the furnace system, and noise is reduced. The secondary combustion air gap draws secondary combustion air into the path of combustion/burning downstream of a venturi plate (e.g., shoot-through plate) of the burner assembly, such that the velocity of the flow through the venturi plate is reduced, which reduces the sound level of combustion. The secondary combustion air gap and secondary combustion in general will be described in detail below.

Figure 1:
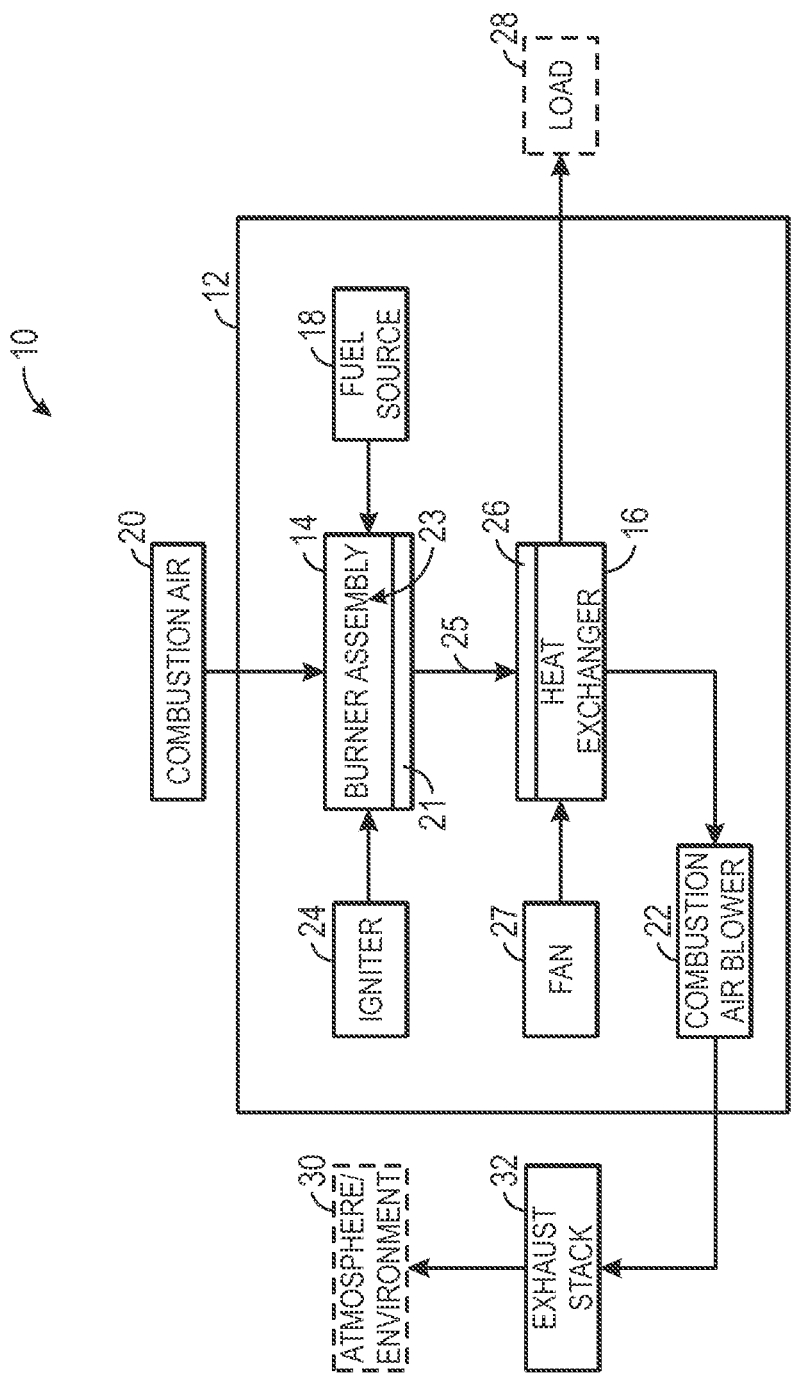
FIG. 1 is a schematic block diagram of a furnace system in accordance with an embodiment of the present disclosure.

Turning now to the figures, FIG. 1 illustrates a schematic block diagram of a furnace system 10 in accordance with present embodiments. The furnace system 10 may include a vessel 12 that includes a burner assembly 14 and a heat exchanger 16, among other components, inside the vessel 12. Depending on the embodiment, the burner assembly 14, the heat exchanger 16, and other components of the vessel 12 may be housed in separate vessels, separate portions of the vessel 12, or in a single portion of the vessel 12. Additionally, the various components of the furnace system 10 may be coupled to a surface of the vessel 12, external or internal to the vessel 12.

In the present embodiment, a fuel source 18 may provide fuel to individual burners within the burner assembly 14. The fuel may include natural gas, liquefied petroleum gas, fuel oil, coal, wood, or the like. Air, or some other oxidant, may also be provided to the burners in the burner assembly 14 from an oxidant or combustion air source 20. For example, combustion air from the combustion air source 20 may be drawn into each individual burner of the burner assembly 14 to mix with the fuel drawn into each individual burner of the burner assembly 14, as set forth above. The combustion air source 20 may be a vessel with compressed oxidant (e.g., compressed air), or the combustion air source 20 may be atmosphere (e.g., a space external to the burner assembly 14). For example, the combustion air source 20 may be an area within the burner assembly 14 external to the individual burners of the burner assembly 14. In certain embodiments, the air may be sucked from atmosphere or some area proximate the burners into the burners of the burner assembly 14 via a pressure difference generated by a combustion air blower 22, which may also be responsible for sucking combustion products through the heat exchanger 16. In other words, a flow path may exist between the burners of the burner assembly 14 and the combustion air blower 22, such that the combustion air blower 22 assists in both pulling oxidant (e.g., air) into the burners of the burner assembly 14 and pulling combustion products through the flow path between the combustion air blower 22 and the burner assembly 14. The oxidant, as previously described, may mix with the fuel in the burners to form a combustible mixture, which may be referred to herein as the mixture. The mixture may be ignited in a primary combustion zone 23 of the burners via an igniter 24, where the primary combustion zone 23 refers to all the zones in each of the burners together. For example, an embodiment including four burners may include four total zones, one within each burner, where all four zones together are referred to as the primary combustion zone 23.

A pulse may be sent through the igniter 24 to instruct the igniter 24 to produce a spark adjacent to or within the burners of the burner assembly 14. In some embodiments, a spark may be provided to the primary combustion zone 23 of each burner of the burner assembly 14, such that the mixture within each burner is ignited. In other embodiments, the mixture may be ignited by other means, such as a hot surface igniter or a pilot light flame.

In the illustrated embodiment, once ignited, the mixture in the primary combustion zone 23 may burn and form combustion products. The combustion products, along with a flame, may exit the burners of the burner assembly 14 and pass through openings in a venturi plate 21 (e.g., shoot-through plate) of the burner assembly 14 (e.g., downstream of the burners within the burner assembly 14), where additional combustion air is provided to the flame for enhanced combustion downstream of the venturi plate 21 via a secondary combustion air gap 25.

The secondary combustion air may be pulled into the path of the flame from the secondary combustion air gap 25 via a pressure difference generated by the combustion air blower 22. In doing so, velocity of the flow through the venturi plate 21 is reduced, which reduces the sound level. In other words, upon combustion, combustion products and/or a corresponding flame may pass through openings in the venturi plate 21 and secondary combustion air may then be provided from the secondary combustion air gap 25 (e.g., via the combustion air blower 22) for additional combustion downstream of the venturi plate 21 (e.g., secondary combustion in a secondary combustion zone downstream of the venturi plate 21), where the combustion air provided from the secondary combustion air gap 25 may enhance combustion in the burner assembly 14, outside of the burner assembly 14, or a combination thereof, and may reduce the overall noise of the combustion process. It should be noted that a space may exist between the outlets of the individual burners of the burner assembly 14 and the openings in the venturi plate 21 of the burner assembly 14, and that secondary combustion may take place within this space even before the flame and/or combustion products pass through the venturi plate 21. In other words, secondary combustion may take place upstream of the venturi plate 21 (e.g., between the venturi plate 21 and the outlets of the burners of the burner assembly 14), downstream the venturi plate 21 (e.g., after receiving additional secondary combustion air from the secondary combustion air gap 25), or a combination thereof. The inclusion of the secondary combustion air gap 25 enables secondary combustion to occur at some point downstream of the venturi plate 21, such that combustion is enhanced and such that velocity of the flow through the venturi plate 21 is reduced, as set forth above, which reduces noise. It should be noted that secondary combustion that occurs downstream of the venturi plate 21 may be considered to occur within a secondary combustion zone, but that secondary combustion may also occur upstream of the venturi plate 21 between the venturi plate 21 and the outlets of the burners of the burner assembly 14 (e.g., in a space between the burners and the venturi plate 21).

The openings of the venturi plate 21 are generally aligned with openings of tubes of the heat exchanger 16. In some embodiments, the openings in the venturi plate 21 are also aligned with openings in a panel 26 (e.g., vestibule panel) coupled to the tubes of the heat exchanger 16, where the panel 26 is positioned between the venturi plate 21 and the tubes. Although the boundaries along the openings in the venturi plate 21 may not be directly coupled with or otherwise engaging the tubes, the openings may be generally aligned to facilitate flow there through. In some embodiments, the secondary combustion air gap 25 may partially separate the venturi plate 21 from the tubes, or from a component that includes the tubes (e.g., the panel 26), as will be discussed in detail below. However, during operation, the combustion products still generally pass through the openings in the venturi plate 21 and extend into and through the tubes of the heat exchanger 16 via entry into the openings of the panel 26. In some embodiments, secondary combustion may occur in the area between the venturi plate 21 and the panel 26, and may be enhanced via added combustion air from the secondary combustion air gap 25. However, in other embodiments, secondary combustion may not occur in this area, and this area may only be included to draw secondary combustion air into the path of the combustion products exiting the venturi plate 21, such that secondary combustion may occur just inside the tubes of the heat exchanger 16 (e.g., after passing through the openings in the panel 26).

A fan 27 (hidden in the illustrated embodiment) or some other flow-motivating device may force a medium (e.g., air) over the tubes in the heat exchanger 16 to generate a heated medium by transferring heat from the combustion products to the medium. The fan 27 operates to blow air over the tubes to generate hot air, and the hot air may be exported to a load 28 (e.g., a room) for heating the load 28. It should be noted that the fan 27, in some embodiments, may be a separate component from the heat exchanger 16 and operates to blow air over the heat exchanger 16 to generate the hot air. In another embodiment, the fan 27 may be located inside the heat exchanger 16 (e.g., as a combined component) and may operate to blow the air directly over the tubes of the heat exchanger 16, as previously described. Further, it should be noted that the fan 27 may reside in any appropriate portion of the heat exchanger 16. For example, the fan 27 may be at a bottom of the heat exchanger 16 and blow upwards over the tubes, the fan 27 may be at the left or right of the heat exchanger 16 and blow cross-wise over the tubes, or the fan 27 may be at the top of the heat exchanger 16 and blow downwards over the tubes. Further still, the fan 27 may be a mechanical fan, a centrifugal fan, or some other type of fan.

Combustion products passing through the tubes of the heat exchanger 16 may be motivated through the tubes via the combustion air blower 22. Indeed, the combustion air blower 22 may generate a pressure difference between an area surrounding the burner assembly 14 and a flow path from the burner assembly 14 to an external environment 30. In other words, the combustion air blower 22 may suck air into the burners of the burner assembly 14, suck the combustion products from the burners of the burner assembly 14 into the tubes of the heat exchanger 16, and suck the combustion products through the tubes of the heat exchanger 16. Additionally, the combustion air blower 22 may be configured to pull the combustion products from the heat exchanger 16 and blow the combustion products into an exhaust stack 32 of the furnace system 10, which may be configured to export the combustion products from the furnace system 10 into the environment 30 or some other area external to the furnace system 10. Further still, the combustion air blower 22 may be responsible for pulling secondary combustion air from the secondary combustion air gap 25 into the path of the flame and combustion products as they travel through the venturi plate 21 and through the panel 26 into the heat exchanger 16.

Figure 2:
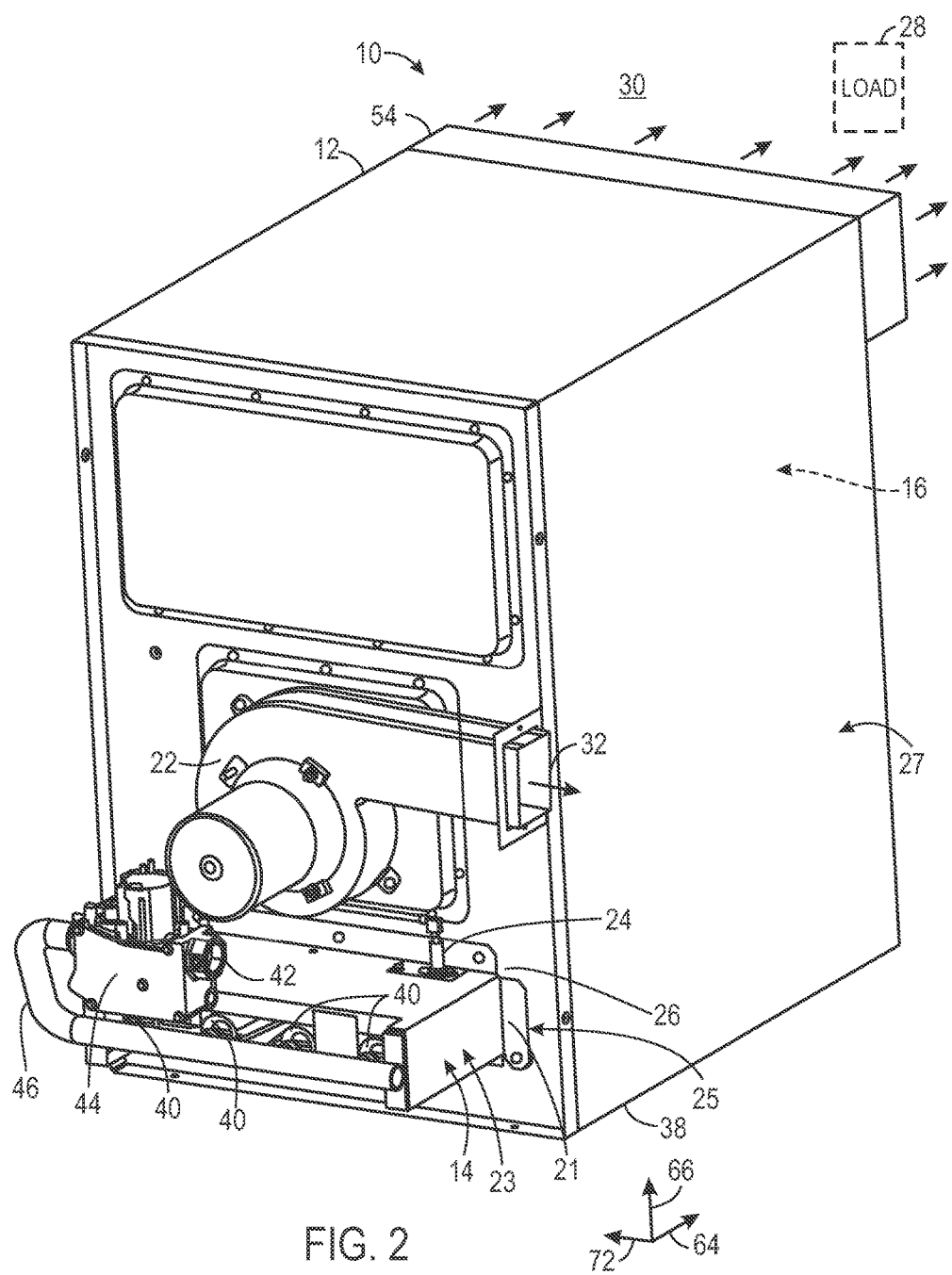
FIG. 2 is a perspective view of a furnace system in accordance with an embodiment of the present disclosure.

In FIG. 2, a perspective view of an embodiment of the furnace system 10 is shown. In the illustrated embodiment, the burner assembly 14 is located near a bottom surface 38 of the furnace system 10. Four burners 40 are located within the burner assembly 14. As previously described, each burner 40 is configured to combust a mixture of air and fuel. Air is sucked into each burner 40 via a pressure difference generated by the combustion air blower 22. Additionally, in the illustrated embodiment, fuel is routed from a fuel source (not shown) through a gas inlet 42 of a control valve 44. The control valve 44 is coupled to a manifold 46, which distributes the fuel to each burner 40. In some embodiments, the fuel may be distributed via the manifold 46 to each burner 40 evenly. The control valve 44 may control a flow of fuel to the burners 40, such that the control valve 44 controls a quantity (e.g., volume) of fuel in the mixture of each burner 40.

An igniter 24 may provide a spark to the burners 40 for igniting the mixture in each burner 40. The combustion/burning occurring within each burner 40 may be considered to be occurring in the primary combustion zone 23. As previously described, the mixture includes air sucked into an interior of each burner 40 and fuel provided to each burner 40 via the manifold 46. However, additional oxidant (e.g., air) may be introduced via the secondary combustion air gap 25 for enhancing combustion/burning. The secondary combustion air gap 25 may be located downstream of the burners 40. In the illustrated embodiment, the secondary combustion air gap 25 is located between the burner assembly 14 and the heat exchanger 16. Specifically, the secondary combustion air gap 25 is located downstream of the venturi plate 21 of the burner assembly 14 and upstream of the vestibule panel 26 of the heat exchanger 16, which may serve as an entire front panel of the furnace system 10. The secondary combustion air gap 25 is configured to enhance combustion (e.g., by providing additional oxidant or combustion air downstream of combustion in the primary combustion zone of the burner assembly 14), and will be discussed in detail (along with the venturi plate 21 and the vestibule panel 26) with reference to later figures. It should be noted that a gap may also exist within the burner assembly 14 between the ends of the burners 40 of the burner assembly 14 and the venturi plate 21 of the burner assembly 14. Accordingly, secondary combustion may occur between the ends of the burners 40 and the venturi plate 21, and may continue downstream of the venturi plate 21 between the venturi plate 21 and the vestibule panel 26. In some embodiments, combustion may not occur between the venturi plate 21 and the vestibule panel 26, but may occur just inside the tubes of the heat exchanger 16, such that the secondary combustion air gap 25 only serves to provide secondary combustion air for secondary combustion within the tubes of the heat exchanger 16.

In the illustrated embodiment, combustion products pass through tubes of the heat exchanger 16. The fan 27, in the illustrated embodiment, is located near the bottom surface 38 of the vessel 12 of the furnace system 10. The fan 27 is configured to blow air over the tubes of the heat exchanger 16, such that the air extracts heat from the combustion products routed through the heat exchanger 16. The hot air is routed through a duct 54 that delivers the hot air to the load 28 (e.g., the room). The combustion products may be pulled through, and blown from, the tubes of the heat exchanger 16 into an exhaust stack 32 (e.g., a chimney), where the combustion products may be exported from the furnace system 10 to the environment 30.

Figure 3:
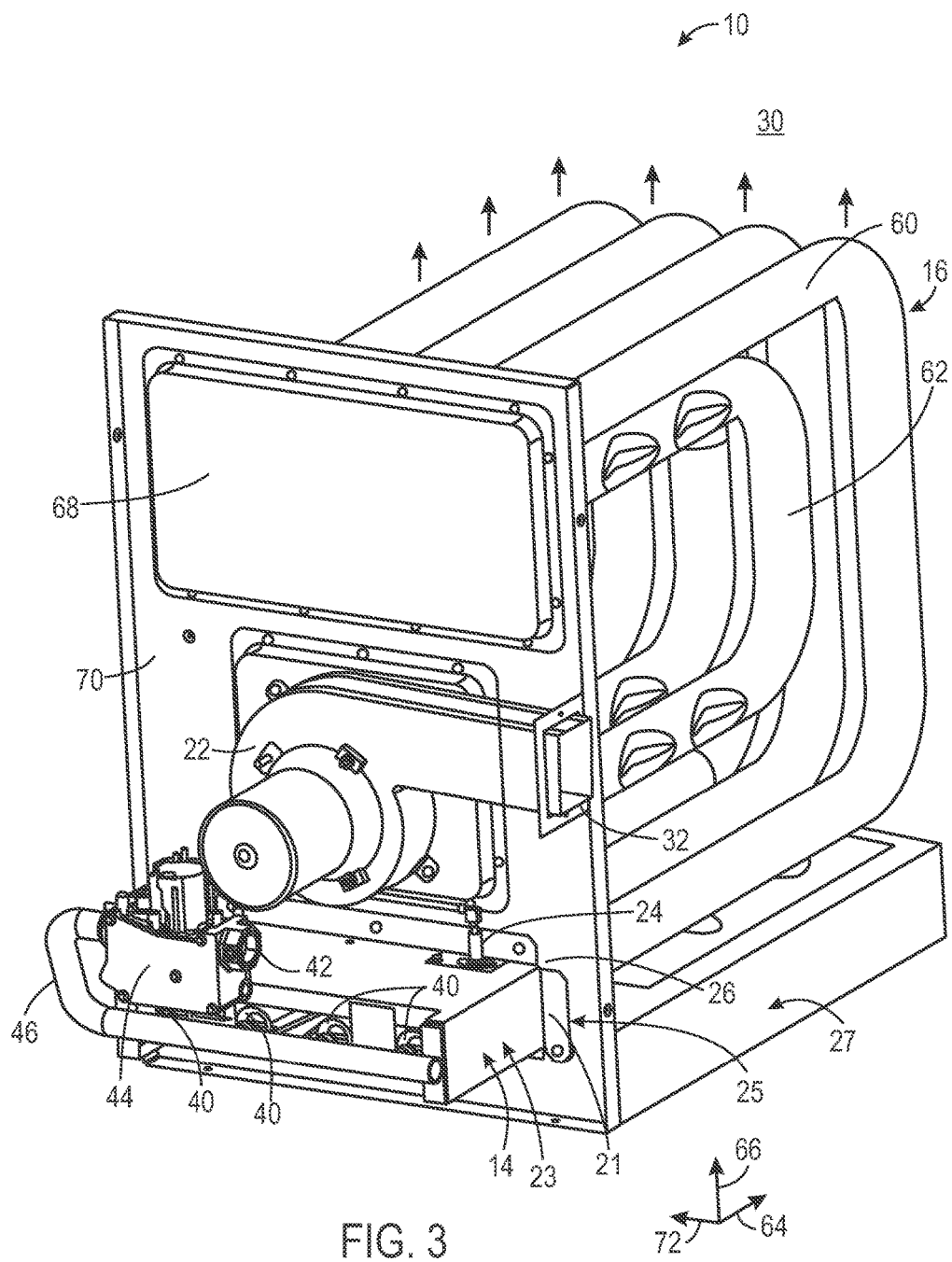
FIG. 3 is a perspective view of a portion of a furnace system in accordance with an embodiment of the present disclosure.

Turning now to FIG. 3, a perspective view of a portion of an embodiment of the furnace system 10 is shown. In the illustrated embodiment, the vestibule panel 26 and tubes of the heat exchanger 14 of the vessel 12 are shown for clarity. As previously described, combustion of the mixture in the burners 40 of the burner assembly 14 (e.g., the primary combustion zone 23) is enhanced via the secondary combustion air gap 25 downstream of the burner assembly 14 and upstream of the vestibule panel 26 (e.g., between the venturi plate 21 and the vestibule panel 26). The combustion products, and/or the flame, are routed through the openings in the venturi plate 21 of the burner assembly 14, through the vestibule panel 26, and into tubes of the heat exchanger 16, where the secondary combustion air gap 25 provides additional secondary combustion air to the flame and/or combustion products downstream of the venturi plate 21. The tubes in the illustrated embodiment include outer tubes 60 and inner tubes 62. The combustion products are routed through the outer tubes 60 in direction 64, upwards in direction 66, and back toward the vestibule panel 26 opposite direction 64.

Coupled to the vestibule panel 26 is a collector box 68, which abuts an exposed surface 70 of the vestibule panel 26 to enclose a volume on a side of the vestibule panel 26 opposite the heat exchanger 16. The exposed surface 70 of the vestibule panel 26 faces away from the heat exchanger 16 of the furnace system 10, opposite direction 64, and the collector box 68 couples to the exposed surface 70. Specifically, the collector box 68 is located over openings of the vestibule panel 26 that are coupled to and/or aligned with the openings of the outer tubes 60 and inner tubes 62, such that combustion products exiting the outer tubes 60 may be routed into the inner tubes 62 via the volume defined by the collector box 68. Additionally, the inner tubes 62 are coupled to the combustion air blower 22, such that the combustion products are sucked through the outer tubes 60, as previously described, into the volume enclosed by the collector box 68, and into the inner tubes 62 of the heat exchanger 16. The combustion products are then routed through the inner tubes 62 in direction 64, opposite direction 66, then opposite direction 64, where the combustion products are blown via the combustion air blower 22 into the exhaust stack 32 for delivery to the environment 30. While the combustion products are routed through the inner tubes 62 and the outer tubes 60, air is blown over the inner tubes 62 and outer tubes 60 via the fan 27. The air is blown generally in direction 66. The air extracts heat from the combustion products passing through the inner tubes 62 and outer tubes 60, and is delivered via the duct 54 to the load 28. It should be noted that different configurations of the inner tubes 62 and the outer tubes 60 may be used in the heat exchanger 16. For example, flow may proceed in an opposite direction or the tubes may be routed in a zig-zag configuration or in a different direction (e.g., direction 72), or in any other manner in accordance with present embodiments.

Figure 4:
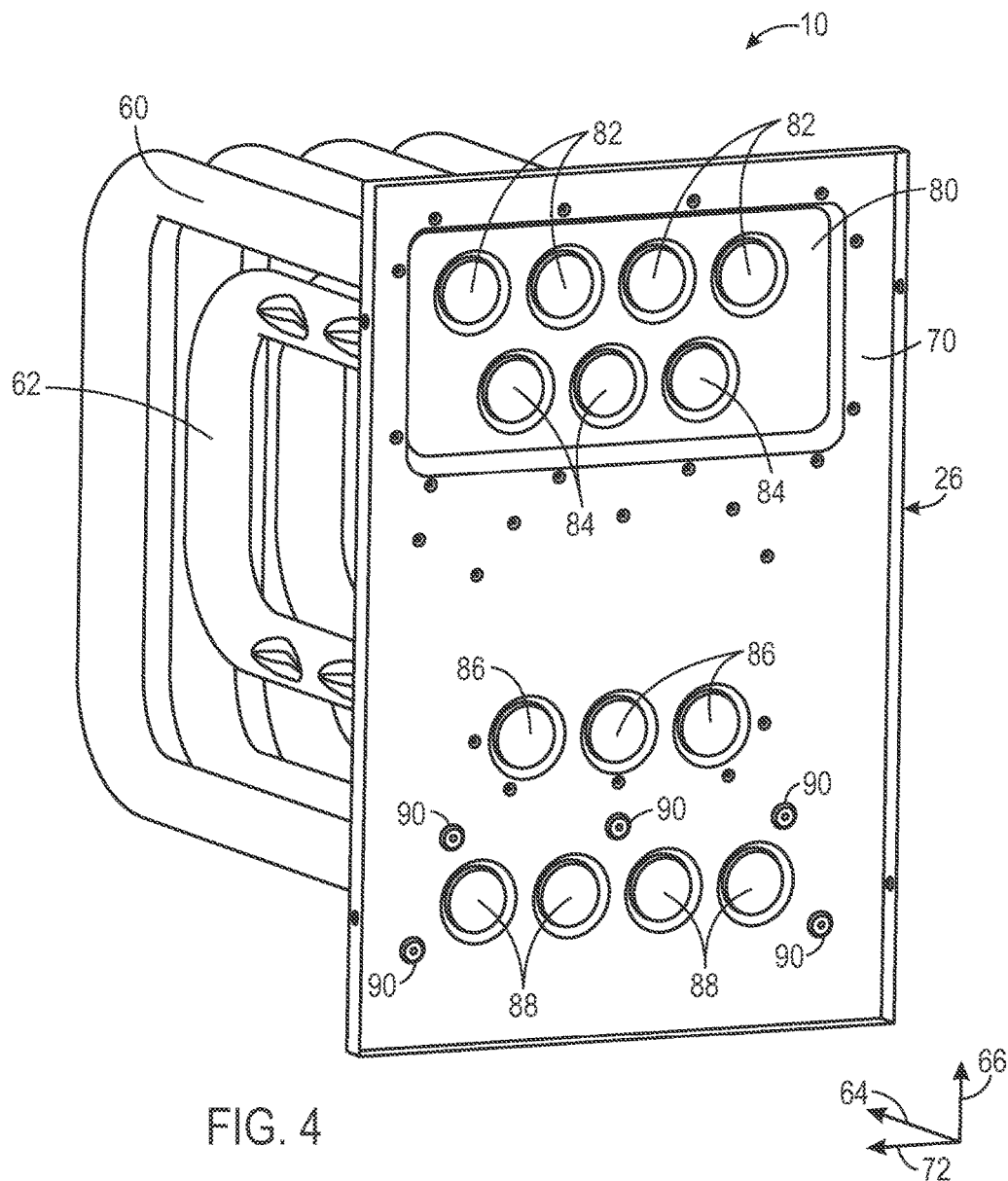
FIG. 4 is a perspective view of a vestibule panel and tubes of a furnace system in accordance with an embodiment of the present disclosure.

In FIG. 4, a perspective view of an embodiment of the vestibule panel 26 with the outer tubes 60 and the inner tubes 62, in accordance with the present disclosure, is shown. In the illustrated embodiment, an indentation 80 in the exposed surface 70 of the vestibule panel 26 is configured to define the volume described above, where the volume is generally enclosed by the collector box 68. In some embodiments, different features may be utilized to define such a volume. As previously described, the combustion products are configured to be routed through the outer tubes 60, through openings 82 into the enclosed volume (as partially formed by the indentation 80), and through openings 84 into the inner tubes 62. The combustion products are pulled through the inner tubes 62 via the combustion air blower 22, through openings 86, and into the exhaust stack 32, as previously described.

Adjacent the openings 86 in the vestibule panel 26 for the inner tubes 62, openings 88 in the vestibule panel 26 for the outer tubes 60 are configured to align with the burners 40 in the burner assembly 14. As previously described, the burners 40 are configured to combust a mixture of air and fuel to generate combustion products. The combustion products pass through the openings in the venturi plate 21 of the burner assembly 14 that generally align with the openings 88, and into the openings 88 in the vestibule panel 26 for the outer tubes 60. As previously described, the secondary combustion air gap 25 is configured to enable enhanced combustion by delivering or facilitating the delivery of additional oxidant to the combustion process. The secondary combustion air gap 25, in accordance with present embodiments, may be exposed to the environment 30 or some other area external to the burner assembly 14. The secondary combustion air gap 25 may, in other words, be located in a space between the venturi plate 21 of the burner assembly 14 and the vestibule panel 26, where the space between the venturi plate 21 and the vestibule panel 26 is at least partially exposed (e.g., not enclosed).

Figure 5:
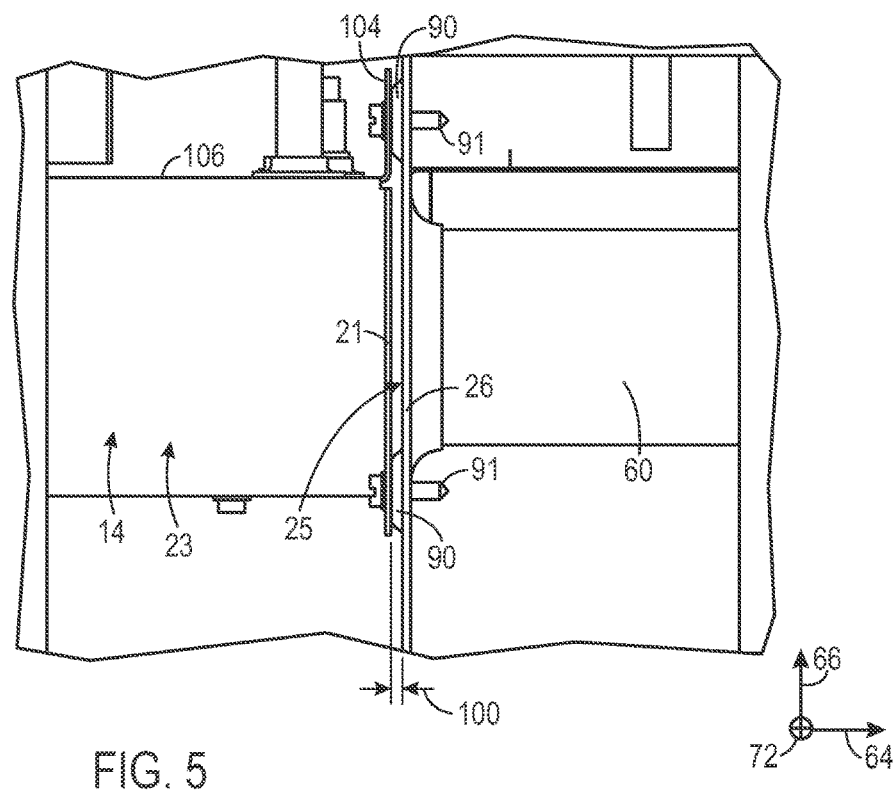
FIG. 5 is a side view of a burner assembly and vestibule panel of a heat exchanger of a furnace system in accordance with an embodiment of the present disclosure.

In the illustrated embodiment, spacers 90 may be disposed on the exposed surface 70 of the vestibule panel 26 to generate the space, or gap (e.g., the secondary combustion air gap 25), between the venturi plate 21 and the exposed surface 70 of the vestibule panel 26. In the illustrated embodiment, five spacers 90 are located at points around the openings 88 in the vestibule panel 26. The spacers 90 may include coupling features 91 (e.g., as shown in FIG. 5) that are configured to couple to the venturi plate 21, or some other element, of the burner assembly 14. This facilitates maintaining a desired offset without applying forces away from the spacers 90 because the coupling features 91 are respectively integral with (e.g., in the center of) the corresponding spacers 90. However, in other embodiments, the spacers 90 may be employed separately from the coupling features 91. By employing the spacers 90, the space between the burner assembly venturi plate 21 and the vestibule panel 26 may be substantially equal, in thickness, to a thickness of the spacers 90. Air may be pulled into the space between the burner assembly 14 and the vestibule panel 26 (e.g., the space enabled by the spacers 90) via a pressure difference generated by the combustion air blower 22, in essentially the same manner air is pulled into the burners 40 for combustion in the burner assembly 14. Accordingly, the secondary combustion air gap 25, located in the space described above, may include additional oxidant (e.g., air) downstream of the burners 40 (specifically, downstream of the venturi plate 21 of the burner assembly 14) for enhanced combustion. By locating the secondary combustion air gap 25 external to the burner assembly 14 and downstream of the burner assembly 14, the additional oxidant is provided at a location that will not increase the velocity of flow in the burners 40 (e.g., as opposed to introducing all the oxidant into the burners 40), and will reduce turbulence around and in the burners 40. Thus, combustion in the burner assembly 14 is smoother and less noisy than would otherwise be the case. Additionally, oxidant provided via the secondary combustion air gap 25, in accordance with present embodiments, improves ignition under cold lighting conditions.

In the illustrated embodiment, the spacers 90 are circular protrusions integrally formed with and extending outwardly from the exposed surface 70 of the vestibule panel 26 opposite direction 62. Five spacers 90 are shown. However, in another embodiment, the furnace system 10 may include more or less than five spacers 90. For example, the furnace system may include 1, 2, 3, 4, 5, 6, 7, 8, or more spacers 90. Additionally, the spacers 90 may be located as shown in the illustrated embodiment, or the spacers 90 may be positioned in another location on the exposed surface 70 of the vestibule panel 26 proximate the openings 88. Further, the spacers 90 may not be integrally formed with the exposed surface 70, but rather coupled to the exposed surface 70 via a fastener, adhesive, or through welding. In certain embodiments, the spacers 90 may be slot-shaped protrusions extending outwardly from the exposed surface 70 of the vestibule panel 26 opposite direction 64. Or, a single spacer 90 may be configured to extend around the openings 88, with gaps configured to allow oxidant (e.g., air) to be pulled into and through the secondary combustion air gap 25 into the path of combustion/burning between the venturi plate 21 and the vestibule panel 26. Further, the spacers 90 may be fasteners themselves, where the spacers are configured to couple the burner assembly 14 to the vestibule panel 26 and the spacers 90 include a component (e.g., a flange) configured to fit between the burner assembly 14 and the vestibule panel 26.

Turning now to FIG. 5, a side view of an embodiment of the burner assembly 14 and the vestibule panel 26 of a furnace system 10 is shown, in accordance with the present disclosure. In the illustrated embodiment, the secondary combustion air gap 25 is disposed between the venturi plate 21 of the burner assembly 14 and the vestibule panel 26, as previously described. In the illustrated embodiment, a thickness 100 of the secondary combustion air gap 25 is approximately 1/8 inch, or 3 millimeters in direction 64, measured from the venturi plate 21 to the vestibule panel 26. In another embodiment, the thickness 100 may be greater than 1/8 inch. In the illustrated embodiment, the thickness 100 of the secondary combustion air gap 25 is substantially equal to a thickness of the spacers 90, where the thickness of the spacers 90 may be determined based on combustion parameters in the burner assembly 14. By way of non-limiting example, in one embodiment, a larger burner assembly 14 with larger burners 40 combusting a greater volume of the mixture may include thicker spacers 90 for increasing the thickness 100 of the secondary combustion air gap 25, such that more oxidant may be introduced in the secondary combustion air gap 25. Or, in another embodiment, a stronger combustion air blower 22 capable of generating a greater pressure difference, as described above, may enable a lesser thickness 100 for pulling in a greater volume of oxidant from the secondary combustion air gap 25. In other embodiments, different geometries and relationships between components may be used to establish the secondary combustion air gap 25.

In any of the above-referenced embodiments associated with FIG. 5, the spacers 90 are configured to enable additional secondary combustion air to be drawn in through the secondary combustion air gap 25, such that secondary combustion may take place downstream of or even within a space between, and aligned with, the openings in the venturi plate 21 and the openings 88 in the vestibule panel 26. For example, combustion/burning may extend from within the burner assembly 14, through the space between the venturi plate 21 and the vestibule panel 26, and into the openings 88 of the vestibule panel 26. As previously described, the spacers 90, as shown, may be integrally formed with the vestibule panel 26. In other embodiments, the spacers 90 may be integral with the venturi plate 21, separate features, part of related fasteners, and so forth. The venturi plate 21, or some other component of the burner assembly 14, may be coupled to the spacers 90 via the coupling features 91 (e.g., fasteners 91), in such a way that openings in the venturi plate 21 align with the burners 40 in the burner assembly 14 and the openings 88 in the vestibule panel 26 associated with the outer tubes 60. In the illustrated embodiment, some of the spacers 90 are coupled to a flange 104 extending from a top 106 of the burner assembly 14, while other spacers 90 are coupled directly to the venturi plate 21. Each of the spacers 90 in the illustrated embodiment is integrally formed with the vestibule panel 26. As previously described, however, the spacers 90 may be otherwise attached to the vestibule panel 26 (e.g., via welding, adhesive, fasteners). Further, the spacers 90 may be otherwise attached to the venturi plate 21 or other component of the burner assembly 14 (e.g., the flange 104). For example, the spacers 90 may be integrally formed with the venturi plate 21 and coupled via adhesive, welding, or fasteners to the vestibule panel 26. Or, the spacers 90 may be separate components that fit between the venturi plate 21 and the vestibule panel 26 and utilize fasteners, adhesive, welding, or some other coupling agent, to attach to both the venturi plate 21 and the vestibule panel 26. Additionally, the spacers 90 may be any shape or thickness in accordance with the description above that may separate the burner assembly 14 and the vestibule panel 26 to enable oxidant to reach the secondary combustion air gap 25 between the venturi plate 21 and the vestibule panel 26. Indeed, in some embodiments, multiple spacers 90 may cooperate to define a spacing associated with the secondary combustion air gap 25. For example, a spacer integral with the vestibule panel 26 may align with a spacer integral with the venturi plate 21 such that their combined heights define the spacing for the secondary combustion air gap 25.

Figure 6:
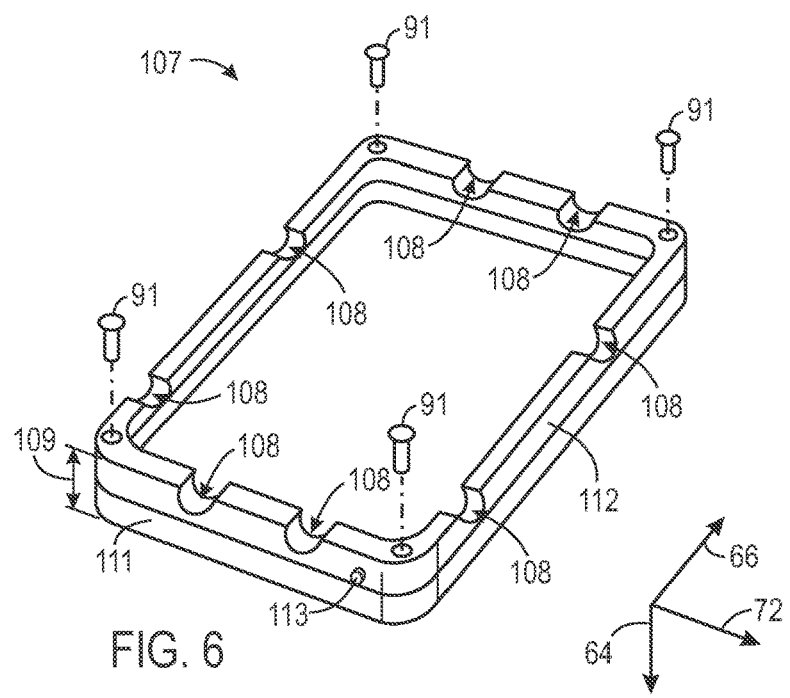
FIG. 6 is a perspective view of a single spacer used to space a burner assembly from a vestibule panel in accordance with an embodiment of the present disclosure.

In yet another embodiment, a single spacer (e.g., a spacer structure 107), as illustrated in a perspective view in FIG. 6, may form an enclosed figure with grooves 108. The spacer structure 107 may include the fasteners 91, as described above, for coupling the spacer structure 107 to the burner assembly 14 (e.g., to the flange 104), the vestibule panel 26, or both. Accordingly, the spacer structure 107 is disposed between the burner assembly 14 and the vestibule panel 26 and the grooves 108 enable oxidant (e.g., air) to enter into the secondary combustion air gap 25. Further, a thickness 109 of the spacer structure 107 may correspond to the thickness 100 of the secondary combustion air gap 25 (e.g., as shown in FIG. 5). In other words, the secondary combustion air gap 25 between the burner assembly 14 and the vestibule panel 26 includes the thickness 100 that corresponds to the thickness 109 of the spacer structure 107. However, in the illustrated embodiment, the thickness 109 of the spacer structure 107 may be adjusted or tuned such that the thickness 100 of the secondary combustion air gap 25 may be increased or decreased for desirable combustion proximate the secondary combustion air gap 25. For example, in the illustrated embodiment, the spacer structure 107 includes a bottom portion 111 extending around the rectangular shape of the spacer structure 107 below the grooves 108. The bottom portion 111 may be extendable or retractable in direction 64. In other words, the bottom portion 111 of the spacer structure 107 may be configured to retract into a top portion 112 of the spacer structure 107 or extend away from the top portion 112 of the spacer structure 107. The bottom portion 111 may include grooves that correspond to the grooves 108 such that, when retracted into the top portion 112 of the spacer structure 107, the grooves of the bottom portion 111 fit around the grooves 108 of the top portion 112 and the grooves 108 of the top portion 112 remain uncovered.

The bottom portion 111 may be retractable and extendable via a tuning mechanism 113 disposed on the spacer structure 107. The tuning mechanism 113, for example, may be a circular crank that can be turned clockwise to retract the bottom portion 111 and counter clockwise to extend the bottom portion 111, or vice versa, depending on the embodiment. In the illustrated embodiment, the tuning mechanism 113 is manually operated. However, in another embodiment, the tuning mechanism 113 may be controlled via an automated controls system (e.g., an automation controller). For example, the controls system may include a sensor that measures various characteristics of combustion proximate the secondary combustion air gap 25 (e.g., temperature, emissions). The sensor may relay the measurements to a processor of an automation controller (e.g., a programmable logic controller) and the processor may execute computer readable instructions (e.g., a computer program) on a non-transitory, machine-readable medium (e.g., a hard drive), where the computer program considers the measurements from the sensor and determines the appropriate thickness 100 of the gap 110 for ideal combustion. The processor may then instruct a controller to tune the spacer structure 107 via the tuning mechanism 113 to extend or retract the bottom portion 111, such that the thickness 109 of the spacer structure 107 corresponds to the desired thickness 100 of the secondary combustion air gap 25 as determined by the processor.

Figure 7:
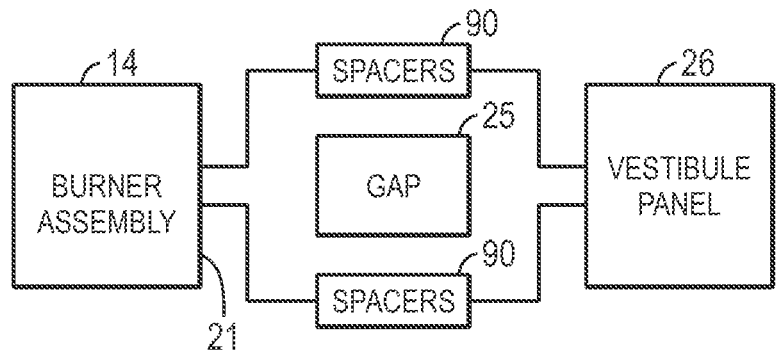
FIG. 7 is a schematic block diagram of a burner assembly and vestibule panel of a furnace system in accordance with an embodiment of the present disclosure.

A schematic block diagram of an embodiment of the burner assembly 14 and the vestibule panel 26 of the furnace system 10, in accordance with the present disclosure, is shown in FIG. 7. As previously described, the burner assembly 14 is elevated away (e.g., separated) from the vestibule panel 26 via spacers 90. The spacers 90 may be coupled to the burner assembly 14, the vestibule panel 26, or both, via coupling devices. For example, the spacers may be integrally formed with the vestibule panel 26 and coupled to the burner assembly 14 via fasteners 91 (not shown), and the spacers 90 may enable the secondary combustion air gap 25 between the burner assembly 14 and the vestibule panel 26. The secondary combustion air gap 25 is exposed to an area external to the secondary combustion air gap 25. In other words, while the spacers 90 elevate the burner assembly 14 away from the vestibule panel 26, the spacers 90 do not fully enclose the secondary combustion air gap 25 between the burner assembly 14 and the vestibule panel 26. For example, the circular spacers 90 in the illustrated embodiment of FIG. 4 do not fully enclose the secondary combustion air gap 25 because there is open space between each circular spacer 90. Embodiments of the present disclosure each include spacers 90 configured to separate the burner assembly 14 from the vestibule panel 26 while enabling oxidant to enter into the secondary combustion air gap 25. Thus, the spacers 90 may be individual slot-shaped spacers 90, circular spacers 90, or any other spacers 90 in accordance with the description above.

Figure 8:
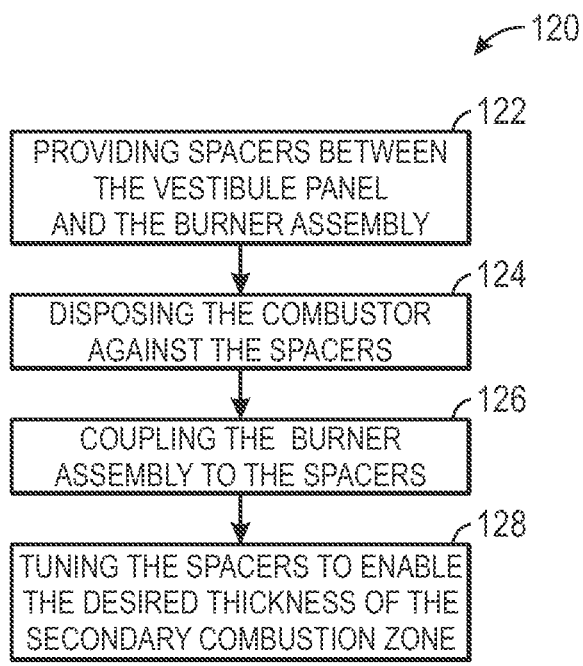
FIG. 8 is a process flow diagram of a method of manufacturing a portion of a furnace system in accordance with an embodiment of the present disclosure.

Turning now to FIG. 8, a method 120 of manufacturing a portion of the furnace system 10 is illustrated, in accordance with the present disclosure, in a process flow diagram. In the illustrated embodiment, the method 120 includes providing spacers between the vestibule panel 26 and the burner assembly 14 (e.g., the venturi plate 21 of the combustor) of the furnace system 10, as shown in block 122. Further, the method 120 includes disposing the burner assembly 14 against the spacers 90, represented by block 124. Further, the method 120 includes coupling the burner assembly 14 to the spacers 90, as shown in block 126. Further still, the method 120 includes tuning the spacers 90 or spacer structure 107, as described above, to enable the desired thickness 100 of the secondary combustion air gap 25, as shown in block 128. As previously described, many embodiments in accordance with the present disclosure, with regards to the spacers 90 and the mechanism by which the spacers 90 and/or the vestibule panel 26 are coupled to the burner assembly 14, may be conceived by those skilled in the art. Accordingly, the appended claims are intended to cover all such modifications and changes as fall within the true spirit of the disclosure.

As discussed in detail above, embodiments of the present disclosure are directed to the furnace system 10 having the burner assembly 14 elevated away (e.g., separated) from the vestibule panel 26, such that the secondary combustion air gap 25 between the venturi plate 21 of the burner assembly 14 and the vestibule panel 26, enabled by the elevation of the burner assembly 14 away from the vestibule panel 26, includes the secondary combustion air gap 25. Including the secondary combustion air gap 25 downstream of the burner assembly 14 (e.g., the venturi plate 21 of the burner assembly 14) and external to the burner assembly 14 as opposed to traditional techniques enables reduced noise and turbulence in the burner assembly 14, improved ignition in the burners 40 of the burner assembly 14 via the igniter 24, and a generally more efficient combustion. Further, present embodiments include features that facilitate tuning of the secondary combustion air gap 25 by increasing or decreasing the spacing for flow there through to provide efficient combustion.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A furnace system, comprising:
   a burner assembly configured to generate combustion products within a primary combustion zone comprising one or more burners;
   a panel disposed downstream of the burner assembly along a flow path for the combustion products, wherein the panel comprises at least one panel opening; and
   a secondary combustion air gap defined by one or more spacers disposed between the burner assembly and the panel, such that a secondary combustion zone is established between the burner assembly and the panel, wherein the secondary combustion air gap is downstream from and external to the burner assembly, wherein the burner assembly comprises a venturi plate and at least one of the one or more spacers is configured to contact the venturi plate, and wherein the secondary combustion air gap is disposed downstream of the venturi plate and upstream of the panel.

2. The furnace system of claim 1, wherein the venturi plate comprises at least one venturi plate opening and the at least one venturi plate opening aligns with the at least one panel opening.

3. A furnace system, comprising:
   a burner assembly configured to generate combustion products in a primary combustion zone;
   a vestibule panel; and
   one or more spacers, wherein the one or more spacers are disposed between a first surface of the vestibule panel and a second surface of the burner assembly, wherein the first surface faces the second surface, wherein the one or more spacers are configured to establish a secondary combustion air gap between the first surface and the second surface and the secondary combustion air gap facilitates a secondary combustion zone downstream of the primary combustion zone, and wherein the burner assembly comprises a venturi plate and at least one of the one or more spacers is configured to contact the venturi plate.

4. The furnace system of claim 3, comprising a heat exchanger, wherein the vestibule panel comprises one or more openings configured to align with one or more openings of the venturi plate and with one or more tubes of the heat exchanger.

5. A method of manufacturing a furnace system, the method comprising:
   positioning a panel downstream of a burner assembly within the furnace system to establish a flow path of combustion products from a primary combustion zone in the burner assembly through one or more panel openings in the panel;
   defining a secondary combustion zone downstream of the primary combustion zone along the flow path by disposing one or more spacers between the burner assembly and the panel, wherein the one or more spacers enable a secondary combustion air gap between the burner assembly and the panel; and
integrally forming at least one of the one or more spacers with the panel.

6. The furnace system of claim 1, comprising a tuning mechanism configured to actuate the one or more spacers to tune a thickness of the secondary air combustion gap.

7. The furnace system of claim 6, wherein the tuning mechanism comprises a fastener, a crank, the one or more spacers, or any combination thereof.

8. The furnace system of claim 6, comprising:
a sensor configured to detect an operating parameter of the furnace system; and
a controller configured to receive, from the sensor, data indicative of the operating parameter of the furnace system, wherein the controller is configured to control the tuning mechanism based on the data indicative of the operating parameter of the furnace system.

9. The furnace system of claim 8, wherein the operating parameter comprises a temperature or an emissions content of the furnace system.

10. The furnace system of claim 1, wherein the one or more spacers comprise a spacer structure having a first portion that contacts the panel and a second portion that contacts the burner assembly, wherein the first portion or the second portion comprises a plurality of grooves fluidly coupled with the secondary combustion air gap and an external environment such that the grooves enable a flow of oxidant from the external environment into the secondary combustion air gap.

11. A furnace system, comprising:
a burner assembly configured to generate combustion products within a primary combustion zone comprising one or more burners;
a panel disposed downstream of the burner assembly along a flow path for the combustion products, wherein the panel comprises at least one panel opening; and
a secondary combustion air gap defined by one or more spacers disposed between the burner assembly and the panel, such that a secondary combustion zone is established between the burner assembly and the panel and/or downstream of the panel, wherein the secondary combustion air gap is downstream from and external to the burner assembly, wherein at least one of the one or more spacers is integrally formed with the panel and coupled to the burner assembly via a coupling device.

12. A furnace system, comprising:
a burner assembly configured to generate combustion products within a primary combustion zone comprising one or more burners;
a panel disposed downstream of the burner assembly along a flow path for the combustion products, wherein the panel comprises at least one panel opening; and
a secondary combustion air gap defined by one or more spacers disposed between the burner assembly and the panel, such that a secondary combustion zone is established between the burner assembly and the panel and/or downstream of the panel, wherein the secondary combustion air gap is downstream from and external to the burner assembly, wherein at least one of the one or more spacers is integrally formed with the burner assembly and coupled to the panel via a coupling device.

13. A furnace system, comprising:
a burner assembly configured to generate combustion products within a primary combustion zone comprising one or more burners;
a panel disposed downstream of the burner assembly along a flow path for the combustion products, wherein the panel comprises at least one panel opening; and
a secondary combustion air gap defined by one or more spacers disposed between the burner assembly and the panel, such that a secondary combustion zone is established between the burner assembly and the panel and/or downstream of the panel, wherein the secondary combustion air gap is downstream from and external to the burner assembly, wherein at least one of the one or more spacers is a separate component from the burner assembly and the panel and the at least one of the one or more spacers is coupled to the burner assembly and the panel via a coupling device.

14. A furnace system, comprising:
a burner assembly configured to generate combustion products in a primary combustion zone;
a vestibule panel; and
one or more spacers, wherein the one or more spacers are disposed between a first surface of the vestibule panel and a second surface of the burner assembly, wherein the first surface faces the second surface, wherein the one or more spacers are configured to establish a secondary combustion air gap between the first surface and the second surface and the secondary combustion air gap facilitates a secondary combustion zone downstream of the primary combustion zone, and wherein at least one of the one or more spacers is coupled to the first surface of the vestibule panel via a coupling device.

15. A method of manufacturing a furnace system, the method comprising:
positioning a panel downstream of a burner assembly within the furnace system to establish a flow path of combustion products from a primary combustion zone in the burner assembly through one or more panel openings in the panel;
defining a secondary combustion zone downstream of the primary combustion zone along the flow path by disposing one or more spacers between the burner assembly and the panel, wherein the one or more spacers enable a secondary combustion air gap between the burner assembly and the panel; and
coupling at least one of the one or more spacers to the panel via a fastener.

16. A method of manufacturing a furnace system, the method comprising:
positioning a panel downstream of a burner assembly within the furnace system to establish a flow path of combustion products from a primary combustion zone in the burner assembly through one or more panel openings in the panel;
defining a secondary combustion zone downstream of the primary combustion zone along the flow path by disposing one or more spacers between the burner assembly and the panel, wherein the one or more spacers enable a secondary combustion air gap between the burner assembly and the panel; and
separating the burner assembly from the panel such that the gap is at least one eighth inch in thickness.

17. A method of manufacturing a furnace system, the method comprising:
- positioning a panel downstream of a burner assembly within the furnace system to establish a flow path of combustion products from a primary combustion zone in the burner assembly through one or more panel openings in the panel;
- defining a secondary combustion zone downstream of the primary combustion zone along the flow path by disposing one or more spacers between the burner assembly and the panel, wherein the one or more spacers enable a secondary combustion air gap between the burner assembly and the panel;
- positioning a venturi plate on the burner assembly downstream of burners of the burner assembly, wherein the one or more spacers are configured to contact the venturi plate of the burner assembly; and
- aligning one or more openings of the venturi plate with one or more burners in the burner assembly, the one or more panel openings, and one or more tubes of a heat exchanger, wherein the one or more tubes of the heat exchanger are coupled to the panel.

\* \* \* \* \*